UNITED STATES PATENT OFFICE.

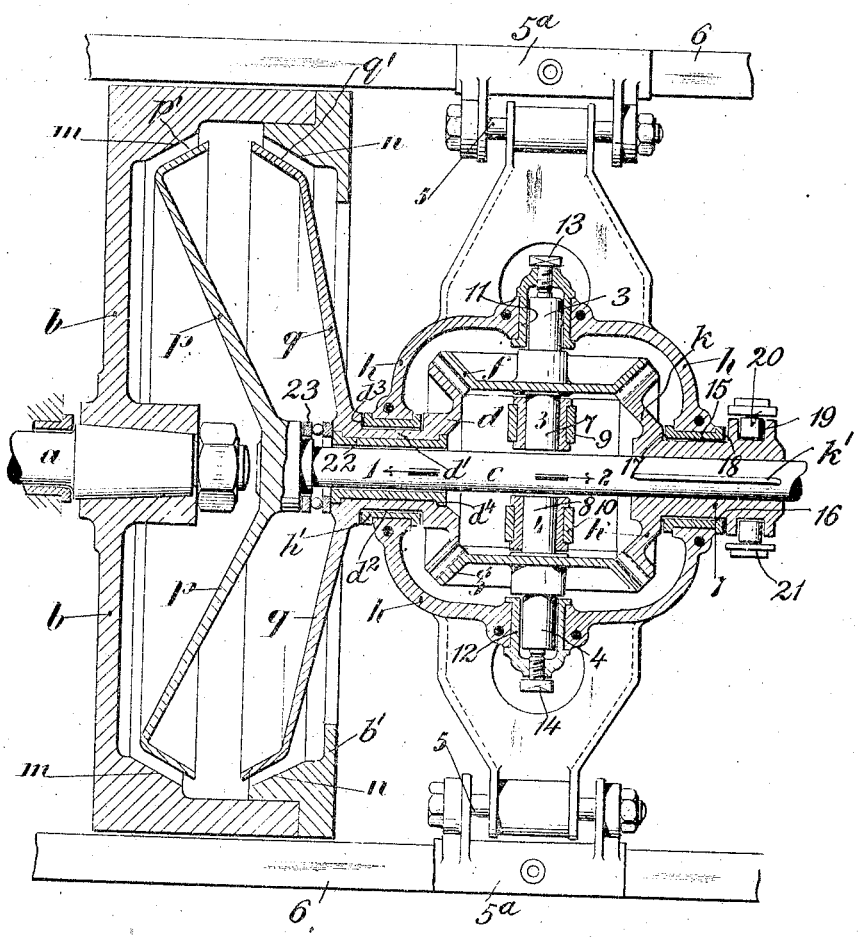

PAUL DAIMLER, OF UNTERTÜRKHEIM, GERMANY.

REVERSING-GEAR.

No. 849,372.  Specification of Letters Patent.  Patented April 9, 1907.

Application filed May 14, 1906. Serial No. 316,775.

*To all whom it may concern:*

Be it known that I, PAUL DAIMLER, a citizen of the Empire of Germany, residing at Untertürkheim, Germany, have invented certain new and useful Improvements in Reversing-Gear, of which the following is a specification, reference being had therein to the accompanying drawing.

This invention relates, broadly, to an improved form of reversing mechanism adapted to be operatively interposed between a driving and a driven member for use in any of the mechanical relations in which the function of such a device is desired.

The invention, however, is more particularly designed and adapted for use in connection with boats, wherein it is designed to be interposed in operative relation between the engine or other driving shaft and the propeller-shaft.

The invention consists in part in the provision of a mechanism of this character so designed and constructed as to be automatically held in reverse driving positions by the action of the screw-propeller.

The invention further consists of a reversing mechanism wherein the support for the reversing parts is non-rotatably mounted.

The invention will be more fully described in connection with the accompanying drawing and will be more particularly pointed out and ascertained in and by the appended claims.

The accompanying drawing shows a horizontal section of a reversing device embodying the main features of my invention.

Like characters of reference designate similar parts throughout the drawing.

As shown, the device of the invention will be described in its relation to a driving and propeller shaft of a boat, although it will be obvious that the invention need not be restricted to this particular use.

Referring to the drawing, $a$ designates a driving or engine shaft provided with a flywheel or driving member $b$, which, as shown, is so constructed as to constitute one of the elements of a clutch and will be hereinafter referred to as a "clutch-wheel." It may be noted that the provision of a fly-wheel which serves to perform its function and also that of a clutch element is not an essential feature of the invention, as the fly-wheel might be embodied in a separate structure. As shown, the driving member $b$ is provided with friction-surfaces $m$ and $n$, desirably formed on the inner periphery of said wheel. Said friction-surfaces are also preferably conical and are so arranged the one with respect to the other as to present opposing friction-surfaces. In order to facilitate the contruction and assembling of a driving member of this nature, the same may be made in two parts, and, as shown, the removable part $b'$ carries the friction-surface $n$. The driving member $b$ or clutch-wheel coöperates, preferably, with two clutch elements in the performance of its function, said elements being herein shown in the form of coupling or clutch members $p$ and $q$, having conical surfaces $p'$ and $q'$, adapted to engage the frictional surfaces $m$ and $n$, respectively.

$c$ indicates the propeller-shaft, which, as shown, is disposed in alined relation with respect to the driving-shaft $a$ and carries on its outer end the clutch or coupling member $p$, the latter being non-rotatably and non-slidably fixed on said shaft $c$. The shaft $c$ carries the usual screw-propeller (not shown) on its opposite or outer end. The reversing mechanism proper, by means of which the coupling members $p$ and $q$ are made to coöperate with the friction-surfaces $m$ and $n$, and whereby such coöperation is transmitted to the propeller-shaft to rotate the same in opposite directions, consists of the following structure.

$h$ designates a support which in the present construction is shown in the form of a casing movably mounted, preferably in a horizontal plane, upon bolts 5. Said bolts are mounted in brackets 5$^a$, which latter are anchored to horizontal supports 6, the latter consisting of a part of the framework of the vessel or being specially provided, as the case may be.

The reversing-gear proper consists of four meshing bevel gear-wheels $f$, $g$, $d$, and $k$. The wheels $f$ and $g$ are provided with trunnions 7 and 8, mounted in bearings 9 and 10, forming a part of or being secured to the casing $h$. The said wheels $f$ and $g$ are located in alined relation with respect to each other and are transversely disposed with respect to the shaft $c$ and in such a manner as to cause the axes of the wheels $f$ and $g$ to coincide with the axis of said shaft $c$. Said wheels $f$ and $g$ are also provided with trunnions 3 and 4, which are journaled in bearings 11 and 12, provided in the casing $h$, the outer ends of said trunnions being engaged by thrust-bolts 13 and 14, the latter providing means whereby the wheels $f$ and $g$ may be held in prescribed mesh relation with the wheels $d$ and $k$. Said wheel $k$ is non-rotatably and non-slidably mounted on the shaft $c$ by means of a key and feather $k'$ and is provided with an elongated hub 7, journaled in a bearing 15 in the casing $h$ and freely rotatable therein. The hub 7 is provided with an annular recess 16, forming shoulders 17 and 18, adapted to engage the opposite ends of the bearing 15, this operative engagement of the wheel 8 with the casing $h$ affording means whereby longitudinal movement of the wheel $k$ and shaft $c$ may be transmitted to the casing $h$. On the outer end of the hub 7 is formed an annular recess 19, adapted to be engaged by the ring 20 of a reversing-lever 21. The wheel $d$ is provided with a hub $d'$, which is recessed at $d^2$, forming shoulders $d^3$ and $d^4$. A bearing $h'$ is formed in the casing $h$ and serves to receive the hub $d$, the shoulders $d^3$ and $d^4$ engaging the opposite ends of said bearing, and thereby operatively connecting the wheel $d$ with the casing $h$, so that shifting movement of the casing transmitted through the reversing-lever is communicated to said wheel $d$. It will be obvious that by means of the foregoing construction the casing $h$ sustains the strain incident to shifting movement of the parts, thereby relieving the bevel gear-wheels of all stress and strain due to such shifting movement, the said gear-wheels being free to perform their special functions.

As shown, the gear-wheel $d$ is connected with the coupling member $q$, the two parts being formed integral. The hub $d'$, to which both the gear-wheel $d$ and coupling member $q$ are secured, as stated, is slidably and rotatably mounted on the shaft $c$, and preferably a bushing 22 is interposed between said hub and shaft. A suitable antifriction-bearing 23, which may, if desired, be made to act yieldingly, is interposed between the coupling members $p$ and $q$ to retain the same in a prescribed relation with respect to each other.

If it is desired to propel the boat forwardly, the shifting lever 21 is thrust in the direction of the arrow 1, thereby engaging the coupling member $p$ with the friction-surface $m$. This forward-shifting movement of the coupling member is accompanied by a corresponding movement on the part of the coupling member $q$ away from the surface $n$ and also the support of casing $h$ and the wheels $f$, $g$, $d$, and $k$. As before stated, this forward-shifting movement of the casing $h$ and the gear-wheels is effected by power transmitted through the shifting lever 21 to the hub 7 and finally through the casing $h$. In this adjustment of the device the displacing action of the propeller causes a forward thrust on the shaft $c$, thereby serving to maintain the coupling member $q$ in engagement with the friction-surface $m$ without the assistance of auxiliary securing devices. This construction affords a great advantage over previous devices of this character, since it not only dispenses with the cost of construction and installation of such auxiliary securing devices, but also with the time involved in manipulating them.

When a reverse or rearward propulsion of the vessel or boat is desired, the lever 21 is shifted rearwardly or in the direction of the arrow 2 and, acting through the hub 7 and casing $h$, shifts all of the parts rearwardly, bringing the coupling member $q$ into engagement with the friction-surface $n$. While the direction of rotation of the driving member $b$ is at all times the same, reverse rotation of the shaft $c$ is effected by engagement of the coupling member $q$ with the surface $n$ through the medium of the wheels $f$, $g$, $d$, and $k$. As before stated, the coupling member $q$ is loosely mounted on the shaft $c$, and when rotation is imparted to said coupling member it is transmitted through wheel $d$ to wheels $f$ and $g$ and thence to wheel $k$, operating the latter in a reverse direction to the direction of rotation of the coupling member $q$. When the propeller-wheel is operated to propel the boat rearwardly, there is a rearward thrust on the shaft $c$, or, in other words, a thrust in an opposite direction to that imparted to shaft $c$ when the vessel is propelled forwardly, said rearward thrust serving to maintain the coupling member $q$ in tight engagement with the friction-surface $n$.

I claim—

1. A reversing-gear comprising in combination, a driving-shaft, a member therefor provided with oppositely-facing inclined or conical friction-surfaces, coupling members adapted to be alternately engaged with said surfaces, a driven shaft on which one of said coupling members is rigidly mounted, the remaining member being loosely mounted on said driven shaft, a gear rigidly connected with said loosely-mounted coupling member, said gear being loose on said driven shaft, a gear rigidly mounted on said driven shaft, and intermediate gears meshing with said rigid and loose gears to effect rotation thereof in opposite directions, a displaceable casing supporting said coupling members, driven shaft and gears and means for displacing said casing to effect alternate engagement of said coupling members with said friction-surfaces.

2. A reversing-gear comprising in combination, a driving member provided with inclined or conical friction-surfaces, coupling members adapted to be alternately thrust into engagement with said surfaces, a driven shaft to which one of said coupling members is rigidly connected, the other of said members being loosely mounted on said driven shaft, a gear loosely mounted on said driven shaft and rigidly connected with loosely-mounted coupling member, a gear rigidly mounted on said driven shaft, intermediate gears meshing with said rigid and loosely-mounted gears to effect rotation thereof in opposite directions and means for shifting said parts to effect alternate engagement of said coupling members with said friction-surfaces whereby the direction of rotation of said driven shaft may be reversed.

3. A reversing-gear comprising a driving member provided with oppositely-disposed friction-surfaces, and a driven member, friction elements for said driven member adapted to be alternately thrust into engagement with said friction-surfaces, said driven member being adapted to operate a load imparting thrusts to said driven member in accordance with the direction of operation of the load, whereby said friction elements are held in operative relation with said friction-surfaces.

4. A reversing-gear comprising a driving member provided with oppositely-disposed friction-surfaces and adapted to be rotated in a single direction, a driven member, friction elements for said driven member adapted to be alternately thrust into engagement with said friction-surfaces, said driven member being longitudinally movable and adapted to operate a load imparting thrusts to said driven member in accordance with the direction of operation of the load, whereby said friction elements are held in operative relation with said friction-surfaces, and means operatively connecting one of said friction elements with said driven member whereby the latter is driven in a reverse direction when one of said elements is in operative relation with said driving member.

5. A reversing-gear comprising a driving member provided with oppositely-disposed friction-surfaces and adapted to be rotated in a single direction, a driven member, friction elements for said driven member adapted to be alternately thrust into engagement with said friction-surfaces, said driven member being longitudinally movable and adapted to operate a load imparting thrusts to said driven member in accordance with the direction of operation of the load, whereby said friction elements are held in operative relation with said friction-surfaces, means operatively connecting one of said friction elements with said driven member whereby the latter is driven in a reverse direction when one of said elements is in operative relation with said driving member, and mechanism for shifting said means and elements to effect alternate engagement of the latter with said driving member.

6. A reversing-gear comprising a driving member provided with oppositely-disposed friction-surfaces, a driven member, friction elements for said driven member adapted to be alternately engaged with said surfaces, one of said elements being rigidly secured to said driven member, means operatively connecting the other of said elements with said driven member, and a support for said means preventing rotation thereof, said driven member being longitudinally movable and adapted to carry a load imparting thrusts to said driven member in accordance with the direction of operation of said load, said friction-surfaces and elements being arranged so that said thrust serves to maintain the same in operative engagement.

In testimony whereof I hereunto affix my signature in presence of two witnesses.

PAUL DAIMLER.

Witnesses:
ROBERT UHLAND,
ERNST ENTENMANN.